United States Patent [19]

Ciucani

[11] Patent Number: 5,048,361
[45] Date of Patent: Sep. 17, 1991

[54] DEVICE FOR KEEPING THE SPATIAL ATTITUDE OF A MEMBER, CONSTRAINED TO A SWINGING SUPPORT, WITH RESPECT TO A FIXED ELEMENT

[76] Inventor: Mario Ciucani, Via S. Girolamo, Fermo, Italy

[21] Appl. No.: 518,792

[22] Filed: May 4, 1990

[30] Foreign Application Priority Data

May 10, 1989 [IT] Italy .................... 4807/89[U]

[51] Int. Cl.$^5$ .............................................. F16H 35/00
[52] U.S. Cl. .......................................... 74/380; 74/413
[58] Field of Search ...................... 74/380, 384, 412 R, 74/413

[56] References Cited

U.S. PATENT DOCUMENTS 1,355,662 10/1920 Granat .............................. 74/384 X
3,922,930 12/1975 Fletcher et al. ................... 74/384 X Primary Examiner—Allan D. Herrmann
Assistant Examiner—David W. Laub
Attorney, Agent, or Firm—Darby & Darby

[57] ABSTRACT

The device comprises an arm consisting of a number of consecutive segments fixed with one of its ends, to a first pivot protruding from a structure and made revolving so to bring about the oscillation of the arm, with a member supported in revolving mount by a second pivot fastened to the free end of the support, having its lower part extending circumferentially and provided with a toothing which engages with a worm screw supported by the support and dragged to rotation by a number of shafts, bevel gear pairs, supported by the arm and with their terminal end suited to coupled with a sector of crown gear fastened to the structure and concentrical as to the first pivot, so that, following the rotation of the first pivot in either sense the member is subjected to a rotation having the same angular amplitude and opposite direction.

3 Claims, 1 Drawing Sheet

DEVICE FOR KEEPING THE SPATIAL ATTITUDE OF A MEMBER, CONSTRAINED TO A SWINGING SUPPORT, WITH RESPECT TO A FIXED ELEMENT

BACKGROUND OF THE INVENTION

The subject of this invention is a device concerning the support of a mechanical member associated, for instance, with a machine in general.

DESCRIPTION OF THE PRIOR ART

Mechanical members are often mounted onto machines and have various tasks according to the working of the machines or the product worked by the same.

Particularly in the shoe production field, a swinging arm is used, on the free end of which the shoes are sewed. The arm is made to oscillate, and this brings about the drawback that the member, or other operative means, fastened to the free end of the arm accordingly rotates, changing its inclination in respect of the structure of the machine.

SUMMARY OF THE INVENTION

The aim of this invention is to provide a device suited to bring about the steady maintenance of the spatial attitude of a member of any kind, when said member is constrained to a swinging support associated with a fixed structure, such as, e.g., the frame of a machine.

The above aim is achieved by means of a device that comprises an arm consisting of a number of consecutive segments fixed with one of its ends, to a first pivot protruding from a structure and made revolving so to bring about the oscillation of the arm.

The member is supported in a revolving mount by a second pivot fastened to the free end of the support, and has its lower part extending circumferentially and provided with a toothing which engages with a worm screw supported by the support and dragged to rotation by a number of shafts, bevel gear pairs, supported by the arm and with their terminal end suited to couple with a sector of a crown gear fastened to the structure and concentrical as to the first pivot, so that, following the rotation of the first pivot in either sense the member is subjected to a rotation having the same angular amplitude and opposite direction.

BRIEF DESCRIPTION OF THE DRAWINGS

The details of the invention are described and pointed out in the following description, with reference to the drawing attached herewith, in which.

DESCRIPTION OF THE PREFERRED EMBODIMENT

Figure 1:
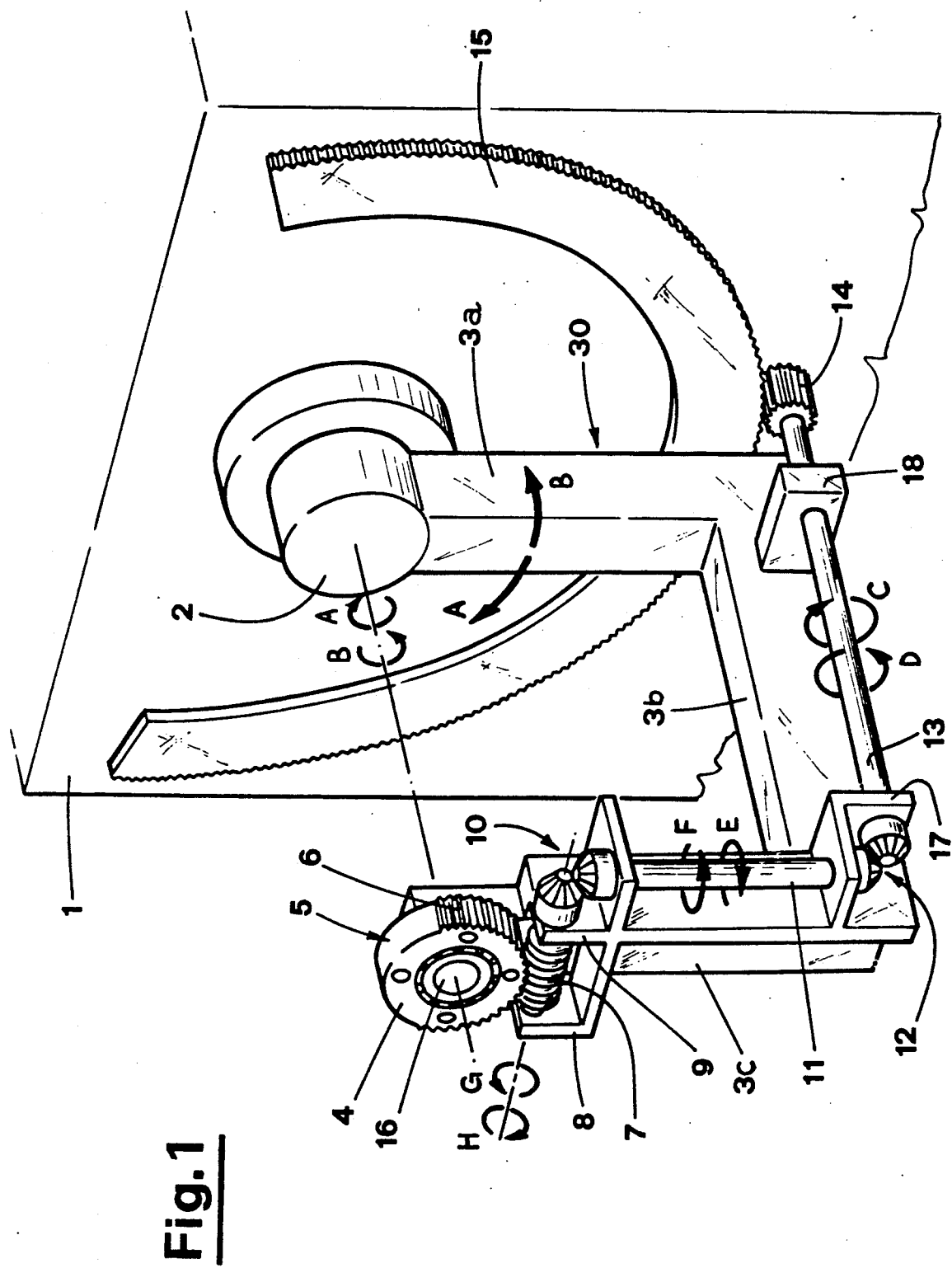
FIG. 1 shows a perspective view of the device in question, in one of its applications.

In said FIGURE, reference no. 1 indicates a generical structure (e.g. the outer casing or the frame of a machine) with which the device in question is associated. From a wall of the structure 1, a first pivot 2 protrudes. The pivot 2 can be made to revolve about its axis through means of known type, therefore not illustrated, in opposed directions A and B.

The end of a support 30, e.g. consisting of a "U" shaped arm, is radially fastened to the first pivot 2.

In the drawing attached herewith, the support illustrated basically includes three rectilinear consecutive segments 3a, 3b, 3c oriented at right angles with respect to each other.

Nevertheless, the invention is feasible even if the support consists of a higher or lower number of rectilinear elements having a different shape.

The free end of the arm 30 supports a member 4, having a cylindrical or ring-shaped body, rotatable around a second horizontal pivot 16 fastened to said free end and having its axis coinciding with the axis of the pivot 2.

The spatial attitude of the member 4 must be kept steady, i.e. the cylindrical body must not revolve in consequence of the rotation of the pivot 2 in the direction A or B, and of the consequent swinging of the arm 30 according to A or B. For instance, the upper surface of the member 4 may define a working plane 5 whose position cannot be changed, while, at the same time, it is necessary to move the arm 30 to allow the processing of bulky materials or objects having particular shapes.

Alternatively, it is possible to lock to the member 4, through known means, a support plane (not illustrated) or a further generical device (not illustrated as well), the spatial attitude of which is to be kept unchanged.

The lower portion of the circumferential surface is provided with a toothing 6, which engages with a worm screw 7, horizontally supported under the same member 4 by a series of plates 8, 9, made integral with the arm 30. The worm screw 7 is coupled with transmission means 10, 11, 12, 13, and 14, described below in detail. One end of the worm screw 7 is connected, through a first bevel gear pair 10, with a first shaft 11, rotatably supported by the segment 3c, to which it is parallel, by means of further plates made integral with the same segment 3c.

The first shaft 11, in its turn, is connected, through a second bevel gear pair 12, to a second shaft 13, rotatably supported by the segment 3b, to which it is parallel, by means of plates 17 and 18 integral with the same segment 3b. On the end of the shaft 13 which is free and nearer to the structure 1, a gear 14 is keyed, which engages with a sector of a crown gear 15 integral with the structure 1 and coaxial to the pivot 2.

In view of what has been said above, the axial rotation of the cylindrical body 4 is prevented by the coupling between the toothing 6 and the worm screw. As it is well known, the transmission of motion is unidirectional and irreversible in a worm screw arrangement.

The oscillation of the arm, in consequence of the rotation of the pivot 2 in the sense A or in the sense B, causes the axial rotation of the second shaft 13 according to the sense C or D respectively. In the same way, the first shaft 11 is caused to rotate respectively in the sense E or F and, accordingly, the worm screw revolves axially in the sense G or H.

The result is a relative rotation of the member 4 in the opposite sense and having the same angular amplitude with respect to the sense of rotation of the pivot 2; this is achieved through a suited gearing-down in the couplings between crown gear 15 and gear 14, and between worm screw 7 and toothing 6.

However, in substance, with respect to a fixed reference element, e.g. the structure 1, no motion of the member 4, occurs since the effect of rotation of the pivot 2 and the support 3 is completely cancelled by the relative counter-rotation given to the same member 4 by the system comprising the crown gear 15, the second shaft 13, the first shaft 11, the worm screw 7 and the toothing 6.

Thus the spatial attitude of the member 4 remains unchanged even in consequence of the oscillation of the arm or support 30, therefore the position of the surface 5 or of any device fastened to the body 4 is not changed.

As a result of this construction, a working surface 5 is provided on the member 4, or attachments can be made to the region of the working surface 5, that will remain stationary when the arm 30 is made to move in either direction A or B from one position to the next position. Accordingly, a work piece or a tool attached to the member 4 is accessible from every direction without changing the orientation of the member 4 or an attachment to the member 4.

As illustrated in FIG. 1, such attachment, the surface 5 and the member 4 are accessible in every direction. From the front, rear, above, the right side and left side. There is no access from below, as illustrated. However, when access is required from below or from any angle that is totally or partially obstructed by the arm 30, as illustrated, the arm can be pivoted out of the way about the axis of the pivot 2 so that the work can be accessed from below, or as stated, from any angle. All of this is accomplished with moving the member 4.

Furthermore, it is to be pointed out that the accumulation of clearances due to the presence of two bevel gear pairs 10 and 12, and of the coupling between the gear 14 and the crown gear 15, is also cancelled owing to the irreversibility of motion between worm screw 7 and toothing 6. The rotations inevitably allowed to the member 4, that is the backlash or play have an amplitude determined by the only clearance left between toothing 6 and worm screw 7, and are not affected by the clearances existing in the other couplings.

The shape of the arm 30 illustrated in the drawing is only by way of example, since any other shape is possible for it, provided that motion is transmitted to a worm screw 7 coupled with the toothing 6 through whatever transmission system which follows the development (contours) of the arm 30.

The shape of the upper portion 5 of the cylindrical body 4 may be whatever is required, e.g. defining a plane surface or anything else, to meet its functional requirements, since such a portion is not affected by any component of the device in question.

Finally, the axial rotation of the pivot 2 may be obviously achieved through means of various kinds (known, hence not illustrated) acting directly on the arm 30, for instance by making use of the sector of crown gear 15.

It is understood that the above has been described by way of example and not as a limitation, therefore any possible variation of constructional details (shape of the arm, system for supporting the shafts and the worm screw, or shape of the upper part of the body 4, etc.) is to be considered as covered by the patent hereby applied for, as described above and according to the claims below.

What is claimed is:

1. A device for maintaining the spacial attitude of a member with respect to a fixed reference element, comprising:
   a first pivot protruding from said reference element and subject to oscillation in both directions about its axis;
   a swinging support, said member being connected to said swinging support, said swinging support including a number of consecutive segments connected at one of its ends radially to said first pivot, oscillation of said pivot causing oscillation of said swinging support;
   a second pivot fastened to the free end of said swinging support said second pivot having its axis coaxial with said axis of said first pivot, said member being rotatably supported and on said second pivot;
   at least a sector of a crown gear fastened to said reference element, said crown gear being fixed concentrically with said first pivot;
   transmission means supported by said swinging support, said transmission means having a first end and a second end, said first end toothedly engaging said crown gear;
   a worm gear mounted adjacent to said member, said worm gear having a shaft rotatably supported by said swinging support, the second end of said transmission means engaging said worm gear shaft for rotation of said worm gear, at least a portion of said member being circular and centered about said second pivot axis, said portion having teeth engaging said worm gear,
   rotation of said swinging support in either direction about the axis of said first pivot causing said worm gear to rotate by way of said transmission means engaging said crown gear, the effect of rotation of said swinging support about said first pivot being effectively cancelled by a counter rotational effect produced by said crown gear, transmission means, worm gear and teeth to fix said member relative to said reference element.

2. A device as in claim 1, wherein said transmission means includes a number of shafts, consecutively connected by means of corresponding bevel gear pairs, said shafts corresponding to said segments of said swinging support and following the contour of said swinging support, said shafts being supported by said support segments, the first said shaft in said consecutive plurality of shafts having a gear thereon, said gear coupling with said fixed crown gear, the other end of said consecutive shafts including one said bevel gear pair connected to said worm gear shaft.

3. A device as in claim 1, wherein said swinging support segments are consecutively connected to each other to form an arm.

* * * * *